US012750221B2

(12) United States Patent
Bandi et al.

(10) Patent No.: US 12,750,221 B2
(45) Date of Patent: Sep. 29, 2026

(54) SYSTEM AND METHOD FOR ONBOARDING AN AUTOMATED VEHICLE FOR AUTONOMOUS VEHICLE OPERATIONS USING A SECURE-UNIQUE LIGHT FLASHING PATTERN

(71) Applicant: Ford Global Technologies, LLC, Dearborn, MI (US)

(72) Inventors: Krishna Bandi, Novi, MI (US); Meghna Menon, Ypsilanti, MI (US); Kalpak Kalvit, Milpitas, CA (US); Mario Anthony Santillo, Canton, MI (US); Vyas Shenoy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/173,943

(22) Filed: Apr. 9, 2025

(65) Prior Publication Data

US 2025/0323787 A1 Oct. 16, 2025

Related U.S. Application Data

(60) Provisional application No. 63/632,326, filed on Apr. 10, 2024.

(51) Int. Cl.
*H04L 9/32* (2006.01)
*B60W 50/00* (2006.01)
(Continued)

(52) U.S. Cl.
CPC ............. *H04L 9/321* (2013.01); *G05D 1/226* (2024.01); *H04L 9/0819* (2013.01); *B60W 60/00* (2020.02); *B60W 2556/45* (2020.02)

(58) Field of Classification Search
CPC ... H04L 9/321; H04L 9/0819; H04L 2209/84; G05D 1/226; B60W 60/00;
(Continued)

(56) References Cited

U.S. PATENT DOCUMENTS

| | | | |
|---|---|---|---|
| 9,970,615 B1 | 5/2018 | Cardillo et al. | |
| 10,569,702 B2 | 2/2020 | Baker et al. | |

(Continued)

FOREIGN PATENT DOCUMENTS

| | | | |
|---|---|---|---|
| CN | 116092286 A | 5/2023 | |
| DE | 102023208627 A1 * | 3/2025 | ............ B60W 60/00 |

(Continued)

OTHER PUBLICATIONS

Hahn, D., Munir, A. and Behzadan, V., "Security and Privacy Issues in Intelligent Transportation Systems: Classification and Challenges", IEEE Intelligent Transportation Systems Magazine, Spring 2021, pp. 181-193.

(Continued)

*Primary Examiner* — Harry Y Oh
(74) *Attorney, Agent, or Firm* — Vincent Mastrogiacomo; Brooks Kushman, P.C.

(57) ABSTRACT

A system includes a vehicle system provided with an autonomous vehicle. The vehicle system includes one or more computing devices configured to define a shared virtual secret key with an infrastructure server using a server public key obtained from the infrastructure server, generate a light code pattern to identify the autonomous vehicle using the shared virtual secret key and a code length, transmit a vehicle public key and blinking characteristics of the light code pattern, control one or more selected lighting devices of the autonomous vehicle to perform a flashing sequence indicative of the light code pattern, and transition to a marshalling operation state to have the autonomous vehicle
(Continued)

be controlled by the infrastructure server in response to the autonomous vehicle being identified based on the flashing sequence.

20 Claims, 6 Drawing Sheets

(51) Int. Cl.
*B60W 60/00* (2020.01)
*G05D 1/226* (2024.01)
*H04L 9/08* (2006.01)

(58) Field of Classification Search
CPC .......... B60W 2556/45; B60W 60/001; B60W 50/00; B60Q 2900/40
See application file for complete search history.

(56) References Cited

U.S. PATENT DOCUMENTS

| | | | |
|---|---|---|---|
| 11,299,168 B2 | 4/2022 | Zhang et al. | |
| 2015/0035685 A1 | 2/2015 | Strickland et al. | |
| 2016/0006526 A1 | 1/2016 | Cho et al. | |
| 2020/0389469 A1 | 12/2020 | Litichever et al. | |
| 2021/0250178 A1 | 8/2021 | Herman et al. | |
| 2021/0409335 A1 | 12/2021 | Zhu et al. | |
| 2022/0032874 A1* | 2/2022 | Hayakawa | G08G 1/144 |
| 2022/0055657 A1 | 2/2022 | McIntosh | |
| 2022/0229432 A1 | 7/2022 | Van Wiemeersch et al. | |
| 2022/0345417 A1 | 10/2022 | Kasichainula et al. | |
| 2022/0353732 A1 | 11/2022 | Filippou et al. | |
| 2022/0388505 A1 | 12/2022 | Sharma Banjade et al. | |
| 2023/0110467 A1 | 4/2023 | Jha et al. | |
| 2023/0166769 A1 | 6/2023 | Valasek et al. | |
| 2023/0206755 A1 | 6/2023 | Jha et al. | |
| 2023/0262281 A1 | 8/2023 | Kasichainula et al. | |
| 2023/0298468 A1 | 9/2023 | Jha et al. | |
| 2023/0300579 A1 | 9/2023 | Merwaday et al. | |
| 2023/0377460 A1 | 11/2023 | Sivanesan et al. | |
| 2024/0045426 A1 | 2/2024 | Ditty et al. | |
| 2024/0098666 A1 | 3/2024 | Dural | |

FOREIGN PATENT DOCUMENTS

| | | | | |
|---|---|---|---|---|
| EP | 4147217 A4 | 12/2023 | | |
| WO | 2019130280 A2 | 7/2019 | | |
| WO | 2020125839 A1 | 6/2020 | | |
| WO | WO-2020121009 A1 * | 6/2020 | | H04L 9/32 |

OTHER PUBLICATIONS

M. Nadeem Ahangar, et al., "A Survey of Autonomous Vehicles: Enabling Communication Technologies and Challenges." Sensors 2021, 21, 706. https://doi.org/10.3390/s21030706, 33 pages.
Bateni, S., et al., "Risk and Mitigation of Nondeterminism in Distributed Cyber-Physical Systems," 2023 21st ACM/IEEE International Symposium on Formal Methods and Models for System Design (MEMOCODE), 11 pages.
Bateni, S., et al., "Xronos: Predictable Coordination for Safety-Critical Distributed Embedded Systems," arXiv:2207.09555v1 [cs.DC] Jul. 19, 2022, 13 pages.
Gueltoum Bendiab, et al., "Autonomous Vehicles Security: Challenges and Solutions Using Blockchain and Artificial Intelligence." IEEE Transactions on Intelligent Transportation Systems, vol. 24, No. 4, Apr. 2023, pp. 3614-3637.
John N. Brewer, III, and George Dimitoglou, "Evaluation of Attack Vectors and Risks in Automobiles and Road Infrastructure." arXiv:2006.16374, 6 pages.
Nima Shoghi Ghalehshahii, et al., "Secure Location-Aware Authentication and Communication for Intelligent Transportation Systems." arXIV:2011:09836v1 [cs.CR] Nov. 17, 2020, 9 pages.
Gore, R.N., et al., "Towards Robust Synchronization in IoT Networks," 2019 11th International Conference on Communication Systems & Networks (COMSNETS), 6 pages.
Hasan, K.F., et al., "An Experimental Validation of Precise GNSS Time Synchronization in Vehicular Networks," Submitted to IEEE Transactions for Possible Publication. arXiv:2010.14201v2 [cs.NI] May 3, 2021, 10 pages.
Hasan, K.F., et al., "Precise GNSS Time Synchronization With Experimental Validation in Vehicular Networks," IEEE Transactions on Network and Service Management, vol. 20, No. 3, Sep. 2023, 13 pages.
Idrees, Z., et al., "IEEE 1588 for Clock Synchronization in Industrial IoT and Related Applications: A Review on Contributing Technologies, Protocols and Enhancement Methodologies," IEEE Access, 10.1109/ACCESS.2020.3013669, 19 pages.
Upinder Kaur, et al., "Broadcasting of IoT-Connected Autonomous Vehicles in VANETs Using Artificial Intelligence." Proceedings of the Fifth International Conference on Electronics, Communication and Aerospace Technology (ICECA 2021) IEEE Xplore Part No. CFP21J88-ART; ISBN: 978-1-6654-3524-6, 6 pages.
Lévesque, M. and Tipper, D., "A Survey of Clock Synchronization Over Packet-Switched Networks," IEEE Communications Surveys & Tutorials, vol. 18, No. 4, Fourth Quarter 2016, 22 pages.
Yassine Maalej and Elyes Balti, "Integration of Vehicular Clouds and Autonomous Driving: Survey and Future Perspectives." arXiv:2201.02893v2 [eess.SP] Jan. 15, 2022, 30 pages.
Arooj Masood, Demeke Shumeye Lakew, and Sungrae Cho, "Security and Privacy Challenges in Connected Vehicular Cloud Computing." IEEE Communications Surveys & Tutorials, vol. 22, No. 4, Fourth Quarter 2020, pp. 2725-2764.
Abdul Mateen, et al., "Smart Roads for Autonomous Accident Detection and Warnings." Sensors 2022, 22, 2077. https://doi.org/10.3390/s22062077, 32 pages.
Moussa, B., et al., "Security Assessment of Time Synchronization Mechanisms for the Smart Grid," IEEE Communications Surveys & Tutorials, vol. 18, No. 3, Third Quarter 2016, 22 pages.
Petrov, D., et al., "Distributed GNSS-Based Time Synchronization and Applications," 2016 8th International Congress on Ultra Modern Telecommunications and Control Systems and Workshops (ICUMT), 5 pages.
Chris Van Der Ploeg, et al., "SECREDAS: Safe and (Cyber-)Secure Cooperative and Automated Mobility." arXIV:2303:18170v1 [math.OC] Mar. 31, 2023, 7 pages.
Zhang, K., et al., "Protecting GNSS-based Services using Time Offset Validation," 2020 IEEE/ION Position, Location and Navigation Symposium (PLANS), Portland, OR, USA, 2020, pp. 575-583.

* cited by examiner

400

| code bit position | 1 | | 2 | | 3 | | 4 | | 5 | | 6 | | 7 | | 8 | |
|---|---|---|---|---|---|---|---|---|---|---|---|---|---|---|---|---|
| | SyncBit | CodeBitValue | SyncBit | CodeBitValue | SyncBit | CodeBitValue | SyncBit | CodeBitValue | SyncBit | CodeBitValue | SyncBit | CodeBitValue | SyncBit | CodeBitValue | SyncBit | CodeBitValue |
| | ranging Rate | ranging Rate | ranging Rate | ranging Rate | ranging Rate | ranging Rate | ranging Rate | ranging Rate | ranging Rate | ranging Rate | ranging Rate | ranging Rate | ranging Rate | ranging Rate | ranging Rate | ranging Rate |
| | Turn Lights OFF | | Turn Lights OFF | | Turn Lights OFF | | Turn Lights OFF | | Turn Lights OFF | | Turn Lights OFF | | Turn Lights OFF | | Turn Lights OFF | |
| IndicateLightCode Pattern | | 0 | | 1 | | 1 | | 1 | | 0 | | 0 | | 0 | | 0 |
| Left Indicator | | x | | | | | | | | x | | x | | x | | x |
| Right Indicator | | | | x | | x | | x | | | | | | | | |

FIG. 4

SYSTEM AND METHOD FOR ONBOARDING AN AUTOMATED VEHICLE FOR AUTONOMOUS VEHICLE OPERATIONS USING A SECURE-UNIQUE LIGHT FLASHING PATTERN

CROSS-REFERENCE TO RELATED APPLICATIONS

This application claims the benefit of U.S. provisional application Ser. No. 63/632,326 filed Apr. 10, 2024, the disclosure of which is hereby incorporated in its entirety by reference herein.

TECHNICAL FIELD

The present disclosure relates to a system and/or method for marshalling automated vehicles.

BACKGROUND

The statements in this section merely provide background information related to the present disclosure and may not constitute prior art.

Automated vehicles (AV) are configured to autonomously drive without the need for a human operator. Generally, an AV is provided a destination and using defined algorithms, the AV autonomously drives to the destination using the travel route. In some applications, the AV can also be controlled by an external system that transmits drive commands to the AV.

SUMMARY

This section provides a general summary of the disclosure and is not a comprehensive disclosure of its full scope or all of its features.

In some aspects, the present disclosure is directed to a system including a vehicle system provided with an autonomous vehicle. The vehicle system including one or more computing devices configured to define a shared virtual secret key with an infrastructure server using a server public key obtained from the infrastructure server, generate a light code pattern to identify the autonomous vehicle using the shared virtual secret key and a code length, transmit a vehicle public key and blinking characteristics of the light code pattern, control one or more selected lighting devices of the autonomous vehicle to perform a flashing sequence indicative of the light code pattern, and transition to a marshalling operation state to have the autonomous vehicle be controlled by the infrastructure server in response to the autonomous vehicle being identified based on the flashing sequence.

In some aspects, the present disclosure is directed to a system for autonomously controlling an autonomous vehicle and includes an infrastructure server associated with a facility. The infrastructure server including one or more computing devices configured to: generate a predicted light code pattern using a vehicle public key for the autonomous vehicle to be controlled, transmit a server public key and a code length to the autonomous vehicle, authenticate identity of the autonomous vehicle using the vehicle public key, transmit a flash command initiating a flashing sequence by the autonomous vehicle, and transition to autonomous control of the autonomous vehicle in response to the flashing sequence by the autonomous vehicle being indicative of the predicted light code pattern.

In some aspects, the present disclosure is directed to a method for autonomously controlling an autonomous vehicle. The method includes, by an infrastructure server: generating a predicted light code pattern using a vehicle public key for the autonomous vehicle to be controlled, transmitting a server public key and a code length to the autonomous vehicle, authenticating identity of the autonomous vehicle using the vehicle public key, transmitting a flash command initiating a flashing sequence by the autonomous vehicle, and transitioning to autonomous control of the autonomous vehicle in response to the flashing sequence by the autonomous vehicle being indicative of the predicted light code pattern Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 4 is an example of a light code pattern in accordance with the present disclosure.

DETAILED DESCRIPTION

Figure 1:
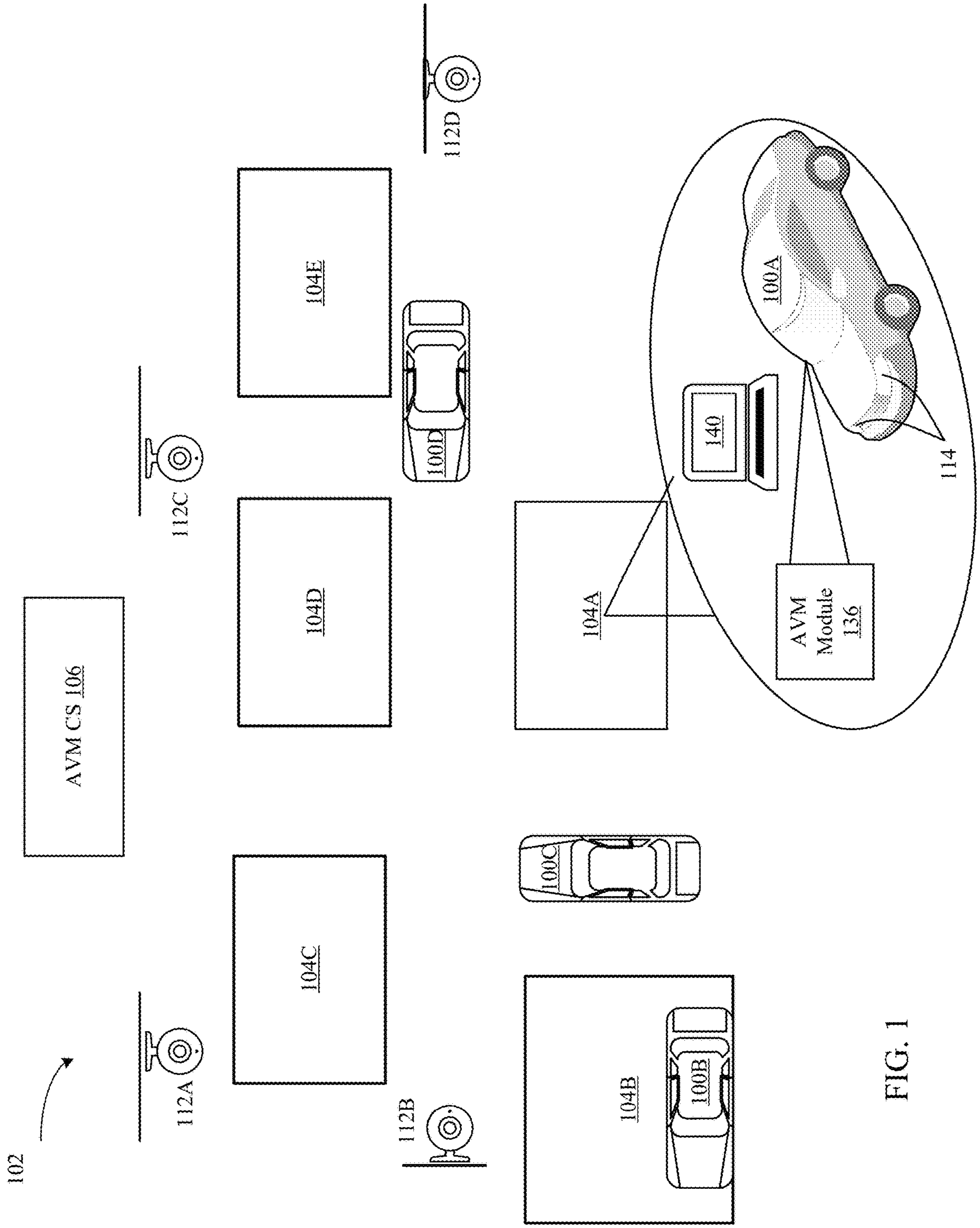
FIG. 1 illustrates a plurality of automated vehicles and an automated vehicle marshal central server (AVM CS) for marshalling the automated vehicle in accordance with the present disclosure.

The following description is merely exemplary in nature and is not intended to limit the present disclosure, application, or uses. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Prior to autonomous control of an AV, a marshalling system may perform a vehicle identification process to recognize and onboard the respective AV. One possible way to perform this vehicle identification process is called a blinking challenge during which the AV blinks one or more light devices in accordance with a selected flashing sequence or, stated differently a blinking pattern. A vision system may be used to detect the flashing sequence performed by the AV to identify the AV.

These blinking challenges may not be unique enough to accurately identify the AV. That is, if the wrong AV is onboarded, the following problems may arise: interference with other AV due to following an incorrect path generated by the marshalling system for another AV; for a manufacturing use case, it could lead to delays in the production cycle times; for a commercial depot marshalling use case, it could lead to mistakenly loading/un-loading of wrong vehicle; for valet parking marshalling use case, it could lead to mistakenly performing incorrect vehicle control and parking in wrong spot where the destination spot was assigned for another AV; for electric charging marshalling use-case it could lead to mistakenly moving the wrong AV to the charging bay and occupying a space allocated for another AV.

Other identification methods may not provide accurate and secure identification either. For example, a license plate recognition technique may employ an infrastructure based sensing that is mounted too far away causing potential misidentification. This method also requires the AV orientated in a certain orientation to detect license plates. In another example, a marker-based identification using, for example, UWB tags, BLE tags, reflective markers, require installation of a physical marker on the AV which may affect quality and does not guarantee uniqueness. Surface based markers require the AV to be in specific areas which places restrictions on the marshalling system.

The present disclosure is directed to a system or method for onboarding an AV using a secure and unique blinking pattern. In one form, the AV is configured to define a shared virtual secret key (e.g., a shared secret key) between the AV and a central server (CS) using a CS public key obtained from the CS. The AV then generates a unique light code pattern for identifying the AV using the shared virtual secret key and a code length specified by the CS. The AV transmits a message providing an AV public key and, at times, blinking characteristics of the light code pattern to the CS, and further controls one or more selected lighting devices to perform a flashing sequence indicative of the light code pattern. The AV transitions to a marshalling operation state to be controlled by the CS in response to the AV being identified based on the light code pattern. The onboarding process of the present disclosure provides a secure and unique technique for identifying and onboarding the AV to a marshalling process.

Figure 2:
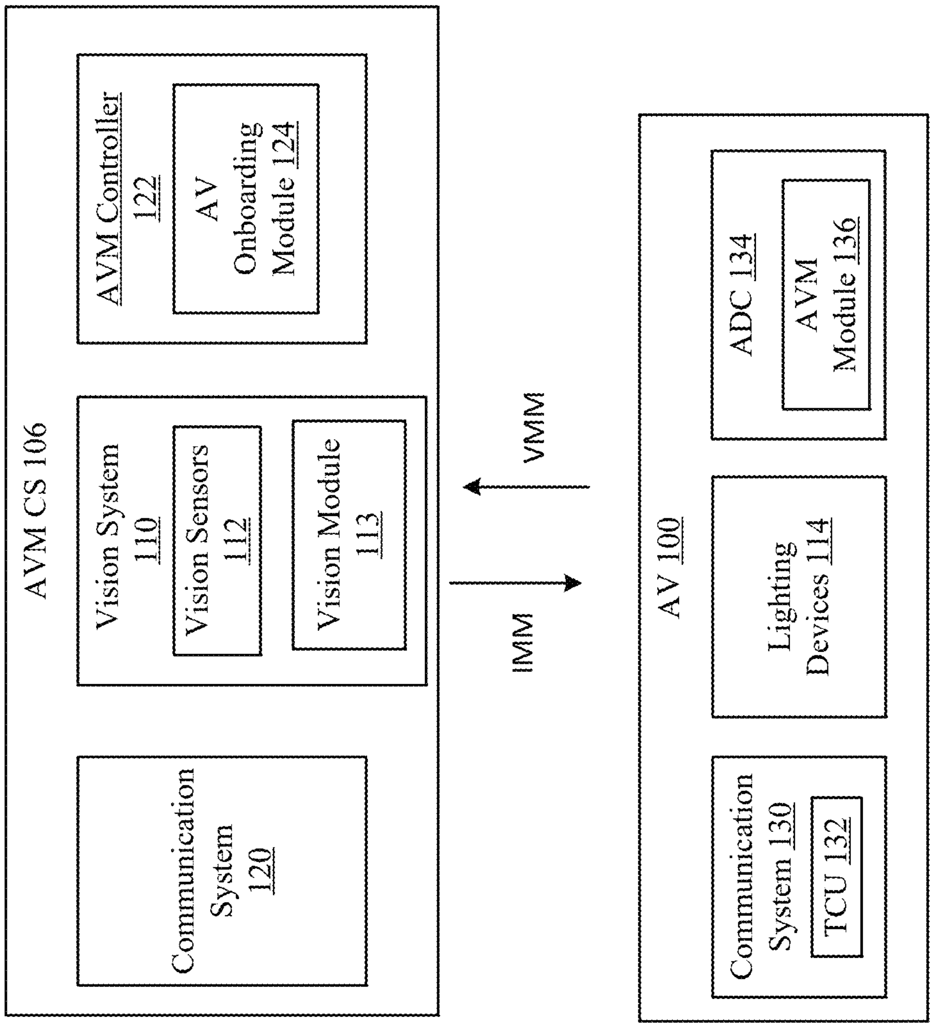
FIG. 2 is a block diagram of an automated vehicle and the AVM CS in accordance with the present disclosure.

Referring to FIGS. 1 and 2, in a non-limiting example, autonomous vehicles 100A, 100B, 100C, 100D (collectively "autonomous vehicles 100") are provided in a facility 102 in which the vehicles 100 are undergoing various system processes, such as calibration, software configuration, and/or testing. In one form, the autonomous vehicles 100 drive to various stations 104A, 104B, 104C, 104D, and 104E (collectively "stations 104") under the control of an automated vehicle marshal central server (AVM CS) 106. That is, the autonomous vehicles 100, as automated vehicles (AVs), drive in the facility based on drive commands from the AVM CS 106, which tracks the location and orientation of the vehicle 100 using a vision system 110 (FIG. 2) that may be part of the AVM CS 106.

In the following, the autonomous vehicles 100 are referred to as automated vehicles (AV) 100. While the AVs 100 are illustrated as four wheel passenger vehicles, the present disclosure may be applicable to other types of AVs 100, such as but not limited to automatic guided vehicles, vehicles having one or more wheels, vehicles having a track moved by wheels/rollers, among other vehicles that can be autonomously controlled.

In one form, the vision system 110 includes a plurality of vision sensors 112 (e.g., cameras) that capture images of various areas of the facility 102, where the images are then processed by a vision module 113 to recognize, for example, the AV 100 and at times specific regions of the AVs 100, such as one or more light devices 114.

In addition to the vision system 110, the AVM CS 106 also includes a communication system 120 and an AVM controller 122 having an AV onboarding module 124 of the present disclosure.

In one form, the communication system 120 is configured to support wireless and/or wired communication with, for example, the visions sensors 112, the AVs 100, among other devices and/or controllers in the facility 102. In one form, the communication system 120 is configured to establish wireless communication using any suitable wireless communication protocol (e.g., a Bluetooth®-type protocol, a cellular protocol, a wireless fidelity-type (WiFi-type) protocol, a near-field communication (NFC) protocol, an ultra-wideband (UWB) protocol, among others). Accordingly, the communication system 120 may include various hardware (e.g., router, antenna, wires, input-output interface; and/or processor) and computer software for realizing the various wireless communication protocols.

The AVM controller 122 is configured to control the AV 100 through the facility 102 using various drive commands. Prior to marshalling the AV 100 to the various stations 104, each AV 100 is on-boarded by the AV onboarding module 124. As detailed herein, the AV onboarding module 124 is configured to perform a secure-unique hand-shake protocol in which the AV 100 is requested to identify itself using a unique blinking pattern performed by one or more lighting devices on the AV 100. The vision system 110 captures the blinking pattern and the AV onboarding module 124 decodes the pattern to determine if the AV 100 is the correct vehicle that is communicating with the AVM controller 122.

In one form, the AV 100 is configured to include a communication system 130 having a telematics control unit (TCU) 132, the lighting devices 114, and an autonomous drive controller (ADC) 134. While the lighting devices 114 is illustrated as front headlamps, the lighting devices 114 may include other devices such as, but not limited to: rear brake-lights; front/rear fog lights side view mirror lights, and parking lights.

The communication system 130 is configured to support wired and wireless communication with external devices or systems using various suitable techniques and/or wireless protocols (e.g., a Bluetooth® type protocol, a cellular protocol, a wireless fidelity-type (WiFi-type) protocol, a near-field communication (NFC) protocol, an ultra-wideband (UWB) protocol, among others). In one form, the TCU 132 is employed to support vehicle-to-everything communication (V2X) communication.

The ADC 134 is configured to autonomously drive the AV 100 by controlling a drive system (not shown) of the AV 100. The ADC 134 controls the AV 100 to a desired destination using, for example, drive control algorithms stored and executed by the ADC 134 and/or using drive commands from the AVM CS 106. In one form, the ADC 134 includes an AV marshal (AVM) module 136 configured to on-board the AV 100 with the AVM CS 106, so that the AVM CS 106 may control the AV 100 through the facility 102.

In one form, the AVM controller 122 is configured to communicate with the AVs 100 using infrastructure marshalling messages (IMM) wirelessly transmitted using the communication system 120. The ADC 134 of the AV 100 is configured to communicate with the AVM CS 105 using vehicle marshalling messages (VMM) that are wirelessly transmitted using the communication system 130.

Prior to being controlled by the AVM CS 106 during marshalling process, a new AV 100 undergoes an on-boarding process during which the AVM CS 106 recognizes and identifies the new AV 100A to confirm that the AVM CS 106 is communicating with the correct new AV 100A. For the on-boarding process, the AV onboarding module 124 and the AVM module 136 communicate using secure messaging techniques that not only mitigate interference by a third-party, but also contribute to the generation of a unique blinking sequence employed by the new AV 100A during a blinking challenge to visually identify the new AV 100A in the facility 102. Specifically, the AVM CS 106 communicates with the new AV 100A using IMMs. However, IMMS may not be sufficient to recognize and identify the AV 100A within the facility 102 during onboarding for various reasons including, but not limited to, interference by a third party and/or the vision system 110 may not be able to identity the AV 100 in the facility 102. Accordingly, the AV onboarding module 124 and the AVM module 136 define a unique blinking challenge for the AV 100A that is visually captured by the vision system 110 and processed by the AV onboarding module 124 to confirm whether the correct AV 100 is being onboarded.

In one form, the AV onboarding module 124 of the AVM CS 106 and the AVM module 136 of the AV 100 employ a private-public key encryption technique as the secure messaging technique. The AVM module 136 is configured to define a shared virtual secret key (e.g., a shared secret key) based on a central server (CS) public key provided by the AV onboarding module 124. The AVM module 136 further generates a light code pattern for the blinking challenge using the shared virtual secret key and a code length variable from the AV onboarding module 124.

In some instances, the AV onboarding module 124 provides blinking characteristics for the blinking challenge including a blinking light rate code bit and sync bit. The blinking characteristics may be determined based on the imaging capability of the vision system 110 such that ON-OFF period of the lighting devices 114 is not too fast that the vision system 100 is not able to capture the flashing sequence. In addition to or in lieu of the blinking characteristics from the AV onboarding module 124, the AVM module 136 provides blinking characteristics of the blinking challenge to the AV onboarding module 124, but differs to the blinking characteristics that is capturable by the vision system 110.

The AVM module 136 transmits an AV public key to the AV onboarding module 124 along, which determines the shared virtual secret key to verify the AV 100, and then decodes a predicted light code pattern to be used for the blinking challenge using the shared virtual secret key, the code length, and/or the blinking characteristics.

The AVM module 136 executes the flashing sequence or blinking pattern using one or more selected lighting devices of the AV 100, and the AV onboarding module 124 determines if the flashing sequence matches the light code pattern based on information form the vision system 110. If the flashing sequence does not match, then the AV 100 is unknown or not identified. If the flashing sequence does match, the AV 100 is recognized in the facility 102 and identified as an AV to be marshalled.

Using the public-private key encryption technique as a variable to define a unique light code pattern, the AV onboarding module 124 is able to distinguish a selected AV 100 from other AVs 100 that may be captured by the vision system 110. In addition, using the public-private key encryption techniques during the onboarding process provides a level of security against a third-party attempting to interfere with the marshalling control of the AV 100.

Details regarding the onboard process of the present disclosure is described below, which includes example messages that are exchanged between the AVM CS 106 and the AV 100. In the description below, operation of the various steps is described in terms of the AVM CS 106 and the AV 100 that is trying to onboard (e.g., AV 100A).

The IMMs and the VMMs exchanged between the AVM CS 106 and the AV 100 include different fields for communicating specific information to the recipient. In a non-limiting example, Table 1 provides a list of specific fields provided in the IMMs and/or VMMs.

TABLE 1

| Message Fields | |
|---|---|
| Field | Abbreviation |
| Identity Management | IdMgt |
| State Flow Identification Command | StateFlowIdCmd |
| IMM Data Management | IMMDataMgt |
| Vehicle Identification Command | VehIdCmd |
| Drive Command | DrvCmd |
| State Flow Identification Command Response | StateFlowIdCmdResp |
| VMM Data Management | VMMDataMgt |
| Vehicle Identification Command Response | VehIdCmdResp |
| Vehicle State | VehState |

Identity management provides details of one or more identifiers for the AV 100. In a non-limiting example, the identity management includes four data elements such as vehicle ID, session ID, mission ID, and facility ID. As several sessions can in principle be related to the same vehicle over time, the vehicle ID data element uniquely identifies the AV 100. The format of the vehicle ID may be similar to a vehicle identification number (VIN). In some forms, an OEM could in principle decide to use real VIN or pseudo VINs, as long as the identifier is uniquely defined and provided to the AVM CS 106 (e.g., the AVM CS 106 receives the VIN from an OEM cloud based server).

The session ID data element is a unique identifier to a sequence of interactions for a given AV 100 between start of destination and end of destination. It identifies a set of multiple tasks or mission IDs (e.g., a sequence of driving maneuvers between a start of destination and end of destination). It is negotiated and agreed upfront by both the AVM CS 106 and the AV 100 participants.

The mission ID data element identifies and describes a task that is negotiated and agreed by the AVM CS 106 and the AV 100 (e.g., driving from a parking location (origin) to the destination for a particular purpose like electric charging, washing, or parking). Tasks are associated with a unique identifier that are used as the mission ID data element, where the unique identifier is known by the AVM CS 106 and the AV 100.

The facility ID data element provides the option for the identification of the infrastructure facility (e.g., a parking lot or a logistics depot, specific plants).

State flow ID command or state flow ID command response (collectively "state flow ID") are employed by both the AVM CS 106 and AV 100 to identify which operation state of the AV marshalling process the AV 100 is on. In a non-limiting example, Table 2 provides a list of states employed for the state flow ID. The state flow ID command/response, may also be referred to as a feature flow command/response.

TABLE 2

| State Flow ID command/Response | |
|---|---|
| Operation State | Definition |
| Un-known | Both AVM CS 106 and AV 100 do not know which state the AVM CS 106 and AV 100 should be for the AV 100. |
| Un-initiated | A default state in which AVM CS 106 and AV 100 system are in in-active state for the AV 100. |
| Pre-onboarding/ Activation | A state in which the AVM CS 106 and AV 100 are performing an activation process for an AVM feature. |
| On-boarding / Identification | A state in which the AVM CS 106 and AV 100 complete authorization for vehicle identification process using blinking activities prior to the AVM CS 106 taking control of the AV 100 for marshalling the AV 100. |
| Marshalling / Automated Control | A state where AVM CS 106 controls the AV 100 to marshal autonomously to perform certain actions and the AV 100 also acknowledges back to the AVM CS 106 about marshalling response via both high data rate and low data rate of wireless communications. |
| De-boarding / Unavailable | A state in which the AV 100 is performing temporarily off-boarding from current active marshalling based on instructions from AVM CS 106 because of human intervention, the AV 100 leaving an area for certain activities, or the AV 100 is asked to power-cycle, among other actions. After switching into this state, the wireless communications between AVM CS 106 and the AV 100 shall stop. |
| Off-boarding / Deactivation | A state in which AVM CS 106 and the AV 100 are performing the deactivation process for respective AVM feature when the AV 100 reached the End Destination and AVM CS 106 shall no longer control the AV 100 from respective ODD area. |

IMM data management includes control information for bidirectional wireless communication between the AVM CS 106 and AV 100 for the AVM CS 106. In a non-limiting example, Table 3 provides the type of information that may be provided with the IMM data management.

TABLE 3

| IMM Data Management | |
|---|---|
| Control Info. | Definition |
| IMM Data Rate | Indicates the data rate of respective AV 100 as part of IMM message and is transmitted at a given interval of time. |
| Rolling Counter From IMM Transmitted | The rolling counter of current IMM messages that are being transmitted to the AV 100. |
| Rolling Counter Of VMM Received | Contains the rolling counter of last received VMM message to detect for potentially lost messages (e.g., data packets) from the AV 100. |
| Vehicle Container Generation Time | Generation time at which AVM CS 106 generated the Vehicle Container for respective AV 100. |
| Vehicle Container Generation Time Confidence | Generation time confidence at which AVM CS 106's time confidence used when generating the vehicle container generation time. |
| VIDCSPublicKey | public key (e.g., 64 bit or unsigned 32bit) is transmitted from the AVM CS 106 to the AV 100 to derive the AV identification secret. |
| Proprietary Extension Field | Provides details to carry specific information or request from the AVM CS 106 system to a specific OEM vehicle |

The drive command contains the motion and drive control operation for the AV 100 and the drive command action is main drive state request for automated vehicle operation. The AVM CS 106 may employ system states as defined in ISO-23374 for operating the AV 100. In a non-limiting example, Table 4 provides some drive commands employed by the AVM CS 106.

TABLE 4

| Drive Command | |
|---|---|
| Command | Definition |
| Unknown | AVM CS 106 indicates when vehicle operation mode is not defined. |
| Inactive | AVM CS 106 indicates inactive when a valid session does not exist. The AV may be located inside or outside of the operation zone. |

TABLE 4-continued

| Drive Command | |
|---|---|
| Command | Definition |
| Processing | AVM CS 106 prepping activities for that AV 100 as part of the AVM feature activation process |
| Active | AVM CS 106 is active when the CS 106 has respective AVM feature for the AV 100 activated successfully, where it has valid wireless connectivity session established with respective AV. |
| Initialize | AVM CS would like to initiate the vehicle identification blinking code and light code pattern encoding-decoding process |
| Identify | AVM CS would like to initiate the safe vehicle identification blinking challenge turn signals preparing and starting flashing process |
| Ready | AVM CS 106 indicates ready when AV identification is complete, session is established, and the user has the authority. |
| Standby-Wait | AVM CS 106 indicates standby-wait to AV 100 until further drive command operation indicated by the AVM CS 106. Example instances where AVM CS determining the destination and route or waits for further commands after reaching the destination. |
| Standby-Sleep | AVM CS 106 indicates standby-sleep when AV 100 ignition is OFF, the wireless communication link of the operation interface may be temporarily disconnected. |
| Normal-Drive | AVM CS 106 indicates normal-drive when AV 100 shall actively drive and follow the path or trajectory commands. |
| Normal-Pause | AVM CS 106 indicates normal-pause when AV 100 is in not marshalling, keep-alive state with low frequency wireless communication data rate of IMM and VMM exchange, state in which vehicle disengages for certain actions at stations for certain time during stationary. |
| Suspend | AVM CS 106 indicates "suspend" when AV operation becomes incapacitated to perform or continue without sufficient measures taken by the AVM-CS 106.<br>In the case that the AV 100 is in marshalling, AVM CS 106 indicates an emergency stop of the AV 100.<br>AV 100 maintains a stationary condition and also when AV hazard lights are turned ON. |
| Temp-Error | AVM CS 106 indicates the occurrence of a temporary error. Depending on the type of the error. AVM CS 106 may continue automated vehicle operation.<br>Duration of the temporary error-state shall be limited to the shortest amount of time defined by one of the sub-systems. Depending on the type of error, the defined time to transition to suspend state may vary, including immediate transition.<br>In the case that transition occurred from normal-drive or normal-pause states, AVM CS may either initiate an emergency stop, continue operation, or perform other means (e.g., degraded operation, comfort stop) to the AV depending on the type of error<br>If transition occurred from standby-wait or standby-sleep states, the AVM CS maintains the AV in a stationary condition.<br>A change in the driving environment that is not considered to be an immediate out of ODD condition but may potentially lead to an out of ODD condition after a certain period of time if the condition worsens.<br>A transient loss of wireless communication connectivity.<br>A sign of a system failure. |
| Recovery | AVM CS 106 indicates recovery when AVM CS can physically access the AV 100. The AV 100 hazard lights are turned OFF.<br>Recovery state duration is not limited and this state may be applied as long as necessary. For example, multiple actions can be necessary to transition to the standby-sleep or standby-wait states accordingly. |

Like IMM data management, VMM data management includes control information for bidirectional wireless communication between the AVM CS 106 and AV 100. In a non-limiting example, Table 5 provides example control information for the VMM data management.

TABLE 5

| VMM Data Management | |
|---|---|
| Control Info. | Definition |
| VMM Data Rate | Indicates the data rate a VMM message will be transmitting at a given<br>interval of time. |
| Rolling Counter From VMM Transmitted | A rolling counter of current VMM message transmitted by AV. |

TABLE 5-continued

| VMM Data Management | |
|---|---|
| Control Info. | Definition |
| Rolling Counter Of IMM Received | Contains the rolling counter of last received IMM message which ensures for any packet loss detection for AVM CS 106. |
| Vehicle Message Generation Time | Generation time at which AV 100 generated the VMM message for respective AV 100. |
| Vehicle Message Generation Time Confidence | Provides details about time confidence at which vehicle message generation time is generated. |
| VIDAVPublicKey | public key (64-bit or unsigned 32 bit) is transmitted from the AV 100 to the AVM CS 106 to derive the identification secret. |
| Proprietary Extension Field | Provides details to carry specific information or request to the AVM CS 106 system from a specific OEM vehicle. |

Blinking sequence carries signals that transmit a code to the AV 100 to generate a blinking pattern. The blinking pattern transmitted by the AV 100 is used by the AVM CS 106 to identify the respective AV 100 at a designated location (e.g., station 104A). A vehicle identification command from the AVM CS 106 may be used for initiating the onboarding identification process. The command provides a code length that is a value indicating how many bits from the CS public key (e.g., vIDCSPublicKey) shall be used for generating the blinking pattern (e.g., a light code pattern). The code length is dynamic with $\mathbf{2}^{CodeLength}$ possible combinations.

The vehicle identification command further indicates a blinking command that includes the current identification request status from the perspective of the AVM CS 106 system for a blinking challenge with the AV 100. In a non-limiting example, Table 6 provides example statuses of blinking command.

TABLE 6

| Blinking Command Status | |
|---|---|
| Status | Definition |
| Undefined | AVM CS 106 is unaware about its Blinking Command for the AV 100 |
| Generate-New-Code (GNC) | Requests a new code be generated when a new vehicle identification cycle is started by the AVM CS 106. There is no intent for flashing in this new code generation process. |
| Generate-New-Light-Pattern (GNLP) | AVM CS initiates a new safe vehicle light code pattern for the same public key. There is no intent for flashing in this new light code pattern process |
| Prepare-For-Flashing (PFF) | Indicates to the AV 100 that the AVM CS 106 is preparing for flashing (e.g., visual sensors such as cameras are being configured to detect the blinking pattern). |
| Start-Flashing (Flash) | Indicates the visual sensors are ready to capture the flashing by the AV 100 and are waiting for the AV 100 to flash the code. |
| Successful (Succ) | Indicates the blinking challenge was successful when the AV 100 is recognized and identified identification successfully. |
| Code Bit Interval Request (CodeBit IntrReq) | Indicates an interval ON rate request to be flashed from respective lighting device 114 of the AV 100 based on capabilities of sensors 112 |
| Sync Bit Interval Request (SyncBitIntrReq) | indicates an interval OFF rate request to be flashed from respective lighting device 114 of the AV 100 based on capabilities of sensors 112 |

The vehicle identification command response provided by the AV 100 provides a response to the blinking command indicating the current state of the AV 100 for the vehicle identification process, and may be referred to as a blinking command response (BLR). In one form, the vehicle identification command response includes a blinking command response, the blinking light rate code bit, and the blinking light rate. In a non-limiting example, Table 7 provides a list of potential blinking command responses. The blinking light rate code bit (BLR-CB) indicates the data rate of vehicle flashing the respective vehicle lights code bit, and the blinking light rate sync bit (BLR-SB) indicates the data rate of vehicle turn lights are OFF for the sync bit.

TABLE 7

| AV Blinking Command Response | |
|---|---|
| Response | Definition |
| Vehicle-Undefined | Default status of the AV 100. |
| Vehicle-Code Identification-In progress (IdIP) | Indicates the AV 100 is decoding the vIDCSPublicKey |
| Vehicle-Code-Identification-Completed (IdC) | AV 100 has successfully decoded the vIDCSPublicKey and then shares the vIDAVPublicKey back to the AVM CS 106 |
| Vehicle-Code-Identification-Failed (IdF) | AV 100 cannot decode the vIDCSPublicKey |
| Vehicle-Code Pattern-Identification-In Progress (CPIdIP) | Indicates the AV 100 is calculating the light code pattern using the code length and SharedvIDSecretKey from decoded vIDCSPublicKey |
| Vehicle-Code Pattern-Identification-Completed (CPIdC) | Indicates AV 100 successfully calculated the light code pattern using the code length and SharedvIDSecretKey |
| Vehicle-Code Pattern-Identification-Unsuccessful (CPIdUS) | Indicates the AV 100 was not able to decode the light code pattern. |
| Vehicle-Ready (VR) | Indicates the AV 100 is ready to perform the light code pattern. |
| Code Bit Interval Response (CodeBitIntrResp) | Indicates lighting device(s) 114 interval rate of flashing the respective lighting devices 114 ON |
| Sync Bit Interval Response (SyncBitIntrResp) | Indicates lighting device(s) 114 interval rate of respective lighting devices 114 are OFF (not flashing) |
| Blinking Bit Type (BlinkBitType) | Indicates whether lighting devices 114 (front, side, rear) are ON/Off to AVM CS 106 |
| Vehicle-Light Flashing-In Progress (LFIP) | Indicates the AV 100 is performing the blinking challenge (e.g., is flashing the code. |
| Vehicle-Light Flashing-Completed (LFC) | Indicates that the flashing sequence indicative of the light code pattern is completed successfully using identified lights. |
| Vehicle-Light Flashing-Failed (LFF) | Indicates the AV 100 cannot flash because of a vehicle error |
| Vehicle-Authorized (VA) | Indicates the AV 100 identification was successful, and the AV 100 will be switching its state flow identification command response and operation mode from next VMM message. |

Vehicle operation mode indicates the current operation mode or state of the AV 100. In a non-limiting example. Table 8 provides some example vehicle operation modes of the AV 100.

TABLE 8

| AV (Oper) Modes | |
|---|---|
| Mode | Definition |
| Unknown | AV 100 indicates when vehicle operation mode is not defined |
| Inactive | AV 100 indicates inactive when a valid session does not exist. The AV 100 may be located inside or outside of the operation zone |
| Initializing | The AV 100 indicates preparing for the mission, when preparing for safe vehicle identification, but has not entered into system management state. |
| Ready | The AV 100 indicates ready when safe vehicle identification confirmation completed is received, session is established, and the user has the authority |
| Prepared | The AV 100 indicates that vehicle is in automated mode (e.g., a safe driving state), but currently does not follow one of the control interfaces (waypoints, trajectory control, etc.). The prepared state is same as standby-wait state. |

TABLE 8-continued

| AV (Oper) Modes | |
|---|---|
| Mode | Definition |
| Standby-Sleep | The AV indicates standby-sleep prior to vehicle's ignition is OFF, the wireless communication link of the operation interface may be temporarily disconnected etc. conditions. |
| Normal-Drive | AV 100 indicates normal-drive when vehicle is in automated mode and actively follows one of the control interfaces (waypoints, trajectory control, . . . ) |
| Terminating | AV 100 indicates terminating when vehicle left automated mode and is terminating AVM related functions. |
| Suspend | The AV 100 indicates suspend when the vehicle is in a critical error state and requires external operator intervention. |
| Temp-Error | The AV 100 indicates temp-error when the vehicle is in a non-critical error state and is initiating a deceleration into stop and hold, prior to suspend. |
| Human-In-Control | The AV 100 indicates when the manual control of the vehicle has been taken over. |
| Station-hold | The AV 100 indicates when the external mfg./customer environment interlocks have taken over and is holding the vehicle from marshalling. |
| Recovery | The AV 100 indicates recovery when AV 100 can respond to AVM CS (e.g., AV Hazard lights are turned OFF). Recovery state duration is not limited and this state may be applied as long as necessary). |

Blinking characteristics of the light code pattern provide information as to ON-OFF state of one or more of the lighting devices 114 of the AV 100. For example, a code sync flashing bit indication may be provided as: "Unknown" when the AV 100 is not aware of the lighting device 114 status; "sync-bit" indicates the AV 100 is not flashing the code bit sequence (e.g., the lighting device 114 are in OFF duration); and "code-bit" indicates the AV 100 is flashing the code bit sequence (e.g., the lighting device 114 are in ON duration).

Figure 3A:
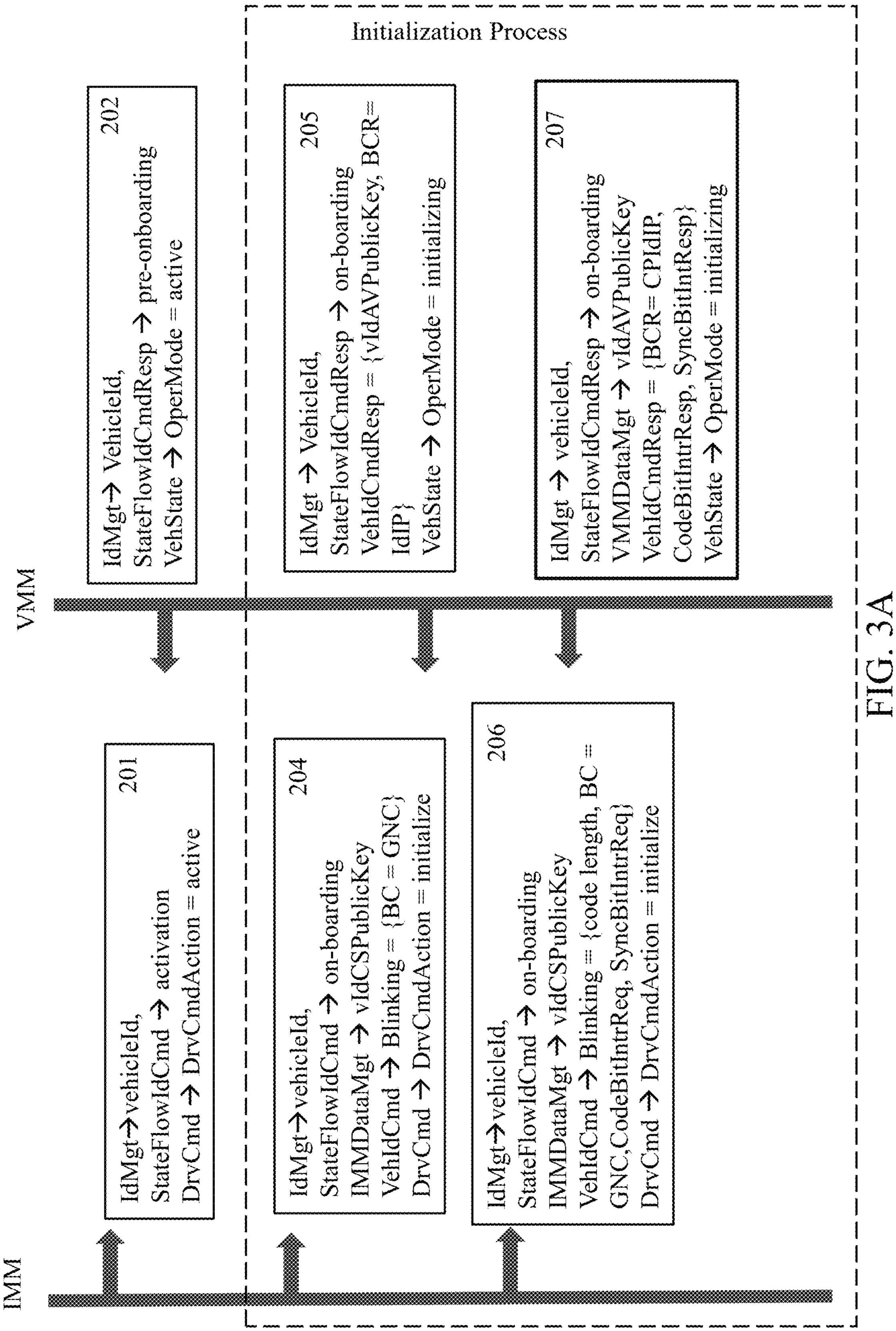
FIG. 3A is a flow diagram of a secure-unique onboarding process for AV marshalling performed by the AV and the AVM CS in accordance with the present disclosure.
Figure 3B:
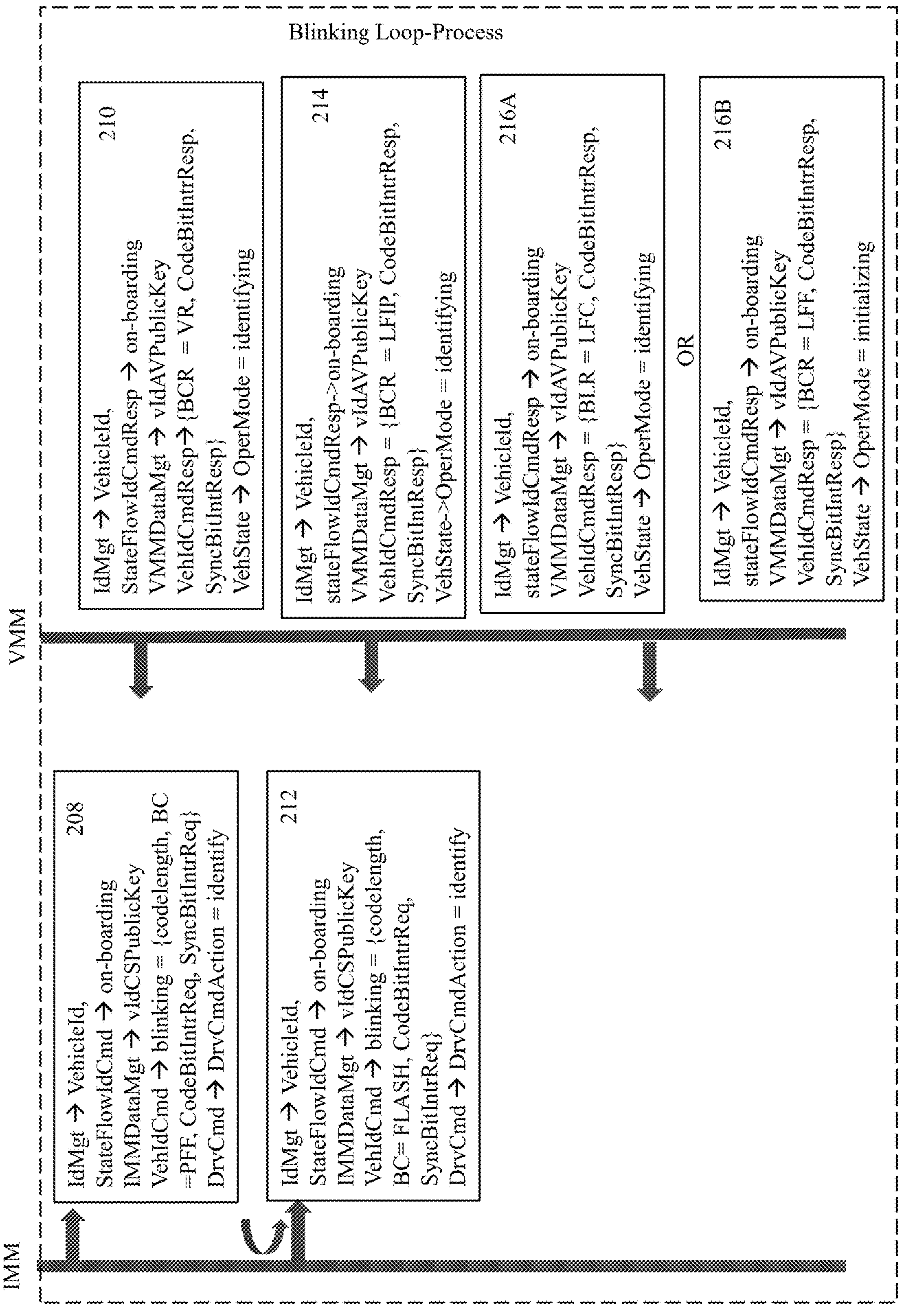
FIG. 3B is a continuation of the flow diagram of FIG. 3A.
Figure 3C:
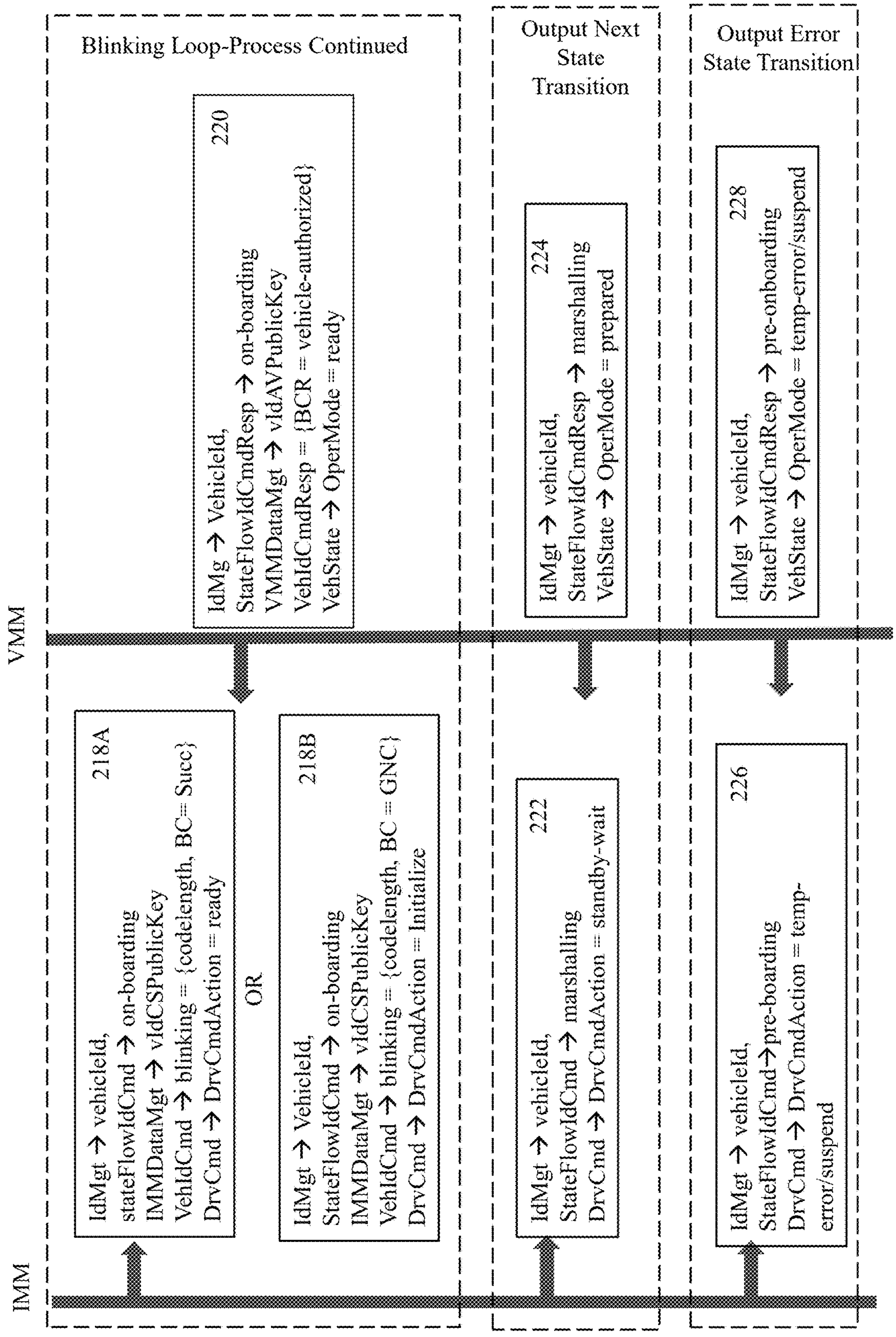
FIG. 3C is a continuation of the flow diagram of FIG. 3B.

Referring to FIGS. 3A, 3B, and 3C an example onboarding or identification process performed by the AVM CS 106 and the AV 100 of the present disclosure is described.

With the AV 100 and the AVM CS 106 in communication using the wireless communication link, the AVM CS 106 transmits a message 201 to the AV 100 indicating the AV CS 106 is in an activation state/process to on-board the AV 100 and in an active drive command AVM CS 106 (e.g., StateFlowIdCmd→activation and DrvCmdAction=actives).

In addition, the AV 100 transmits a message 202 to the AVM CS 106 to enter the on-boarding processing or an activation process. A system operator at the area in which the AV 100 is entering confirms the on-boarding processing of the AV 100. In a non-limiting example, referring to FIG. 1, an operator may transmit a message to the AVM CS 106 confirming presence of the AV 100A at station 104A using a computing device 140. The message 202 includes information to identify the AV 100 (e.g., IDMgt=vehicle ID), identify the operation state of the AV 100 in the marshalling process as preboarding (e.g., StateFlowIdCmdResp=pre-onboarding), and indicate that the operation mode of the AV 100 is not yet defined but active (e.g., VehState→OperMode=active).

In some implementations, the system operator confirms with the AVM CS 106 that the AV 100 is available for onboarding. In other implementations, a confirmation from the system operator may not be needed. In either scenario, the AVM CS 106 and the AV 100 enters an initialization process in which the AVM CS 106 transmits a message 204 to initiate the vehicle identification command using a blinking sequence or, stated differently, the blinking challenge. The AVM CS 106 provides a blinking command to generate a new code and the CS public key, which is employed by the AV 100 to authenticate the sender. In a non-limiting example, the message 204: includes information to identify the AV 100 (e.g., IdMgt=vehicle ID); defines the operation state of the AV 100 in the marshalling process as on-boarding, which may also be referred to as identification state (e.g., StateFlowIdCmd=on-boarding); provides the CS public key (e.g., IMMDataMgt→vdCSPublicKey); defines the blinking command (BC) to generate-new-code (e.g., VehIdCmd→Blinking={BC=GNC}; and indicates that the AVM CS 106 is preparing for safe vehicle identification, and is not in a system management state for the AV 100 (e.g., DrvCmd→DrvCmdAction=initialize).

The AV 100 is configured to transmit a message 205 indicating if the AV 100 is to perform the blinking challenge as requested by the AVM CS 106 in message 204. In some aspects, the AV 100 updates the operation state of the marshalling process to "on-boarding" (e.g., StateFlowIdCmdResp→on-boarding) and begins to decode or verify the CS public key. The AV 100 may transmit message 206 that includes a vehicle identification command response indicating a code identification is in-progress to decode or verify the CV public key with the AV public key (e.g., VchIdCmdResp={vIdAVPublicKey, BCR=IdIP}). Message 206 continues to transmit until the decoding is successful or incomplete, at which time the vehicle identification command response is updated to indicate identification complete or identification failure (e.g., VehIdCmdResp={vIdAVPublicKey, BCR=IdC} or VehIdCmdResp={vIdAVPublicKey, BCR=IdF}), respectfully.

If the code identification is incomplete, the AV CS 106 may retransmit message 204 or the system coordinator may perform a diagnostic check.

If the code identification is complete, the AV CS 106 determines a predicted light code pattern and provides additional information to the AV 100 for defining a light code pattern. Specifically, the AV CS 106 is configured to provide a code length, and in some instance, blinking characteristics for the light code pattern such as a requested code bit interval rate and a sync bit interval rate, as part of the blinking command (e.g., VehIdCmd→Blinking={code length, BC=GNC, CodeBitIntrReq, SyncBitIntrReq}). In some implementations, the AV CS 106 determines the predicted light code pattern in a similar manner as the AV 100, as detailed below.

With the additional information from the AV CS 106 (e.g., code length and blinking characteristics), the AV 100 defines the light code pattern for performing the blinking challenge. The AV 100 further provides the message 207, which includes a vehicle identification command response indicating the identification of the light code pattern is in progress and provides a response the blinking characteristic request by identifying the code bit interval rate and sync bit interval rate. For example, the vehicle identification command response VehIdCmdResp={BCR=CPIdIP, CodeBitIntrResp, SyncBitIntResp}. In some implementations, the message 207 may include the AV public key (e.g., vehicle identification command response may include "vIdAVPublicKey").

Once the light code pattern is determined, the message 207 provides an updated status of via the blink command response as vehicle code pattern identification being completed (e.g., BCR=CPIdC). Alternatively, if the light code pattern was not able determined, the message 207 provided an updated status of the vehicle code pattern identification being unsuccessful (e.g., BCR=CPIdUS). In a non-limiting example, the light code pattern determined may be unsuccessful if the AV 100 does not receive the message 206 after a selected time period has lapsed, or the AV 100 was not able to generate a shared virtual secret key, as detailed below, using the CS public key.

Using the information from the message 204 and 206, the AV 100 is configured to determine a shared virtual secret key using the CS public key, and a light code pattern using the shared virtual secret key and the code length. More particularly, the AVM CS 106 and the AV 100 employ public-key cryptograph to securely transmit message. In one form, the AVM CS 106 and the AV 100 employ a Diffie-Hellman key exchange technique in which the AVM CS 106 and the AV 100 each generate a public/private key pair and distributes the public key of the pair. After obtaining an authentic copy of the public key of the other, the AVM CS 106 and the AV 100 calculate a shared virtual secret key. For this technique, the AVM CS 106 and the AV 100 employ previously agreed upon values of prime (P) and generator (G). While a specific public-key cryptograph technique is provided other suitable encryption techniques may be used.

In a non-limiting example, the AV 100 is configured to generate an AV private key (e.g., VehicleIDPrivateKey) (e.g., an unsigned 64-bit or 32-bit value) that is less than prime (P). Using the CS public key received and the AV private key, the AV 100 is configured to compute a shared virtual secret key (e.g., SharedvIDSecrKey) using, equation 1A.

$$SharedvIDSecrKey = vIDCSPublicKey^{VehicleIDPrivateKey} \bmod(P) \quad \text{Equation 1}$$

The AV 100 is further configured to determine the light code pattern using the shared virtual secret key and the code length. In a non-limiting example, the light code pattern (e.g., IndicatorLightCodePattern) is calculated using equation 2 in which the indicator constant is predefined and agreed upon. In a non-limiting example, an indicator light code pattern may define a code bit value of "0" to indicate a left turn light is ON and a right turn light is OFF and a code bit value of "1" to indicate the left turn light is OFF and the right turn light is ON.

$$IndicatorLightCodePattern = \text{truncate}(SharedvIDSecrKey\ XOR\ IndicatorConstant,\ CodeLength) \quad \text{Equation 2}$$

In a non-limiting example, the AV CS 106 and the AV 100 agree to have $P=2^{32}-17=4294967278$) and GENERATOR (G=7). The AV 100 generates the VehicleIDPrivateKey as a VehicleIDPrivateKey unsigned 32-bit, where VehicleIDPrivateKey $<P$, such as, 1185390551=43425267 $<P$. the AV CS 106 and the AV 100 also agree ton an indicator constant, which is set a default configuration of 0x14FAFAD5, as an example.

Continuing with the example, the SharedvIDSecrKey=3560272037, and the AV CS 106 provides the following information: vIdCSPublicKey=3323458733; codeLength=8; CodeBitIntrReq=20 means 200 msec, and SyncBitIntrReq=25 means 250 msec. The AV 00 and the AV CS 106, at the same or a different times, determine the light code pattern and the predicted light code pattern, respectively using equation 2. For example, with the values provided herein, the IndicatorLightCodePattern=truncate (3560272037 XOR 0x14FAFAD5, 8)=01110000, which can be interpreted in light code pattern 00 of FIG. 4. The values provided herein is for explanation purposes only and other values may be employed.

The AV 100 is further configured to compute an AV public key (e.g., VehicleIDPublicKey. In a non-limiting example, the AV public key is determined using equation 3.

$$vIDAVPublicKey = G^{VehicleIDPrivateKey} \bmod(P) \quad \text{Equation 3}$$

If the AV 100 is able to begin generating the blinking pattern, the AV 100 and the AVM CS 106 enter a blinking loop process to perform the blinking challenge. In particular, the AVM CS 106 prepares to detect the flashing sequence of the AV 100, and transmits a message 208 indicating such preparation as part of the blinking command (e.g., VehIdCmd→blinking={codelength, BC=PFF, CodeBitIntrReq, SyncBitIntrReq}).

In response to the message 208, the AV 100 transmits a message 210 indicating that the AV 100 is ready to perform the blinking challenge (e.g., VehIdCmdResp→ {BCR=VR, CodeBitIntrResp, SyncBitIntResp}) and may also provide the AV public key (e.g., VMMDataMgt→vIdAVPublicKey).

After receiving the message 210, the AVM CS 106 is configured to verify the identity of the AV 100 using the AV public key, and if ready, instruct the AV 100 to perform the flashing sequence via message 212. In one form, to verify the AV 100, the AVM CS 106 calculates the shared virtual secret key (e.g., SharedvIDSecrKey) using the AV public key, and more specifically using equation 4 below in which "AVMCSIDPrivateKey" is CS private key.

$$SharedvIDSecrKey = vIDAVPublicKey^{AVMCSIDPrivateKey} \bmod(P) \quad \text{Equation 4}$$

The message 212 provides the CS public key (e.g., IMMDataMgt→vIdCSPublicKey) and indicates that the vision system 110 is ready to capture the flashing sequence by the AV 100 (e.g., VehIdCmd→blinking={codelength, BC=FLASH, CodeBitIntrReq, SyncBitIntrReq}).

In response to receiving the message 212, the AV 100 transmits message 214 indicating that AV 100 is performing the blinking challenge or stated differently, is flashing the code (e.g., VehIdCmdResp={BCR=LFIP, CodeBitIntrResp, SyncBitIntResp}).

As detailed above, the light code pattern is generated from the "SharedvIDSecrKey" decoded using the public keys (vIDCSPublicKey, VIDAVPublicKey) exchanged over the IMM and VMM messages. In a non-limiting example, the AV 100 flashes a message indicative of the AV public key using the front lights and side mirror projection lights; flashes the decoded complete unique blinking light code pattern on each of the exterior lights; and flashes the unique blinking light code pattern using one or more combinations of selected lights devices 114 to protect from middle-man-attacks and from multiple AVs flashing at same time. Example light device combinations include but are not limited to: front head-lamps and rear brake-lights; front fog lights and rear brake lights; front and rear fog lights; left and right side view mirror lights; and front fog lights and rear parking lights.

Once complete, the AV 100 transmits message 216A indicating flashing sequence is completed successfully using identified lights. (e.g., VehIdCmdResp={BLR=LFC, CodeBitIntrResp, SyncBitIntResp}) or message 216B indicating that the flashing sequence was incomplete or failed due to a vehicle error (e.g., VehIdCmdResp={BCR=LFIP, CodeBitIntrResp, SyncBitIntResp}). In a non-limiting example, the vehicle error may occur when a light module controlling the identified light devices 114 is has an error or is addressing another issue in which case the light module may reject a flashing request from the AVM module 136.

The AVM CS 106 analyzes the images from the vision system 110 to determine if the correct blinking code was provided. Specifically, using equation 2 above, the AVM CS 106 is able to obtain the light code pattern that was to be flashed by the AV 100, and compares the decoded light code pattern with the images obtained.

If the correct flashing sequence pattern was performed, the AV 100 is successfully recognized and identified, and the AVM CS 106 transmits message 218A indicating success (e.g., VehIdCmd→blinking={codelength, BC=Succ}). In addition, the AVM CS 106 indicates that the AV 100 is ready for marshalling (e.g., DrvCmd→DrvCmdAction=ready).

In response to the message 218A, the AV 100 is configured to transmit a message 220 indicating the identification was a success and that the AV 100 is switching its state flow identification command response and operation mode in the subsequent VMM (e.g., VehIdCmdResp={BCR=vehicle-authorized, CLR-CB, BLR-SB}; and VehState→OperMode=ready).

Alternatively, if the flashing sequence pattern was not correct, the AV 100 could not be identified, and therefore, the AVM CS 106 transmits message 218B indicating that a new code be generated (e.g., VehIdCmd→blinking={codelength, BC=GNC}).

With a successful identification, the AVM CS 106 and the AV 100 enter an output next state transition in which the AVM CS 106 provides the next operation state as autonomous marshalling to control the AV 100 to perform certain actions. In a non-limiting example, the AVM CS 106 transmits message 222 indicating a marshalling operation state (e.g., StateFlowIdCmd→marshalling) and has the AV 100 standby and wait for further drive commands (e.g., AVM CS 106 indicates standby-wait to AV 100 until further drive command (e.g., DrvCmd→DrvCmdAction=standby-wait).

In response to the message 222, the AV 100 is configured to transmit message 224 to acknowledge the new operation state (e.g., StateFlowIdCmdResp→marshalling) and that is in an automated mode and is awaiting further instructions (e.g., VehState→OperMode=prepared or ready).

If the AV 100 is not successfully identified after the first blinking challenge or after one or more subsequent blinking challenges, the AV 100 and the AVM CS 106 enter an output error state transition. Here the AVM CS 106 returns to pre-boarding and indicates there is an error (critical or non-critical) in the AV 100 that needs to be reviewed by an operator. For example, the AVM CS 106 transmits message 226 in which operation state is pre-boarding (e.g., StateFlowIdCmd→pre-boarding) and the drive command indicates an error (e.g., DrvCmd→DrvCmdAction=temp-error/suspend). Similarly, the AV 100 transmits the message 228 indicating pre-boarding (StateFlowIdCmdResp→pre-on-boarding) and an error (e.g., VehState→OperMode=temp-error/suspend) or active.

The onboarding marshalling process of the present disclosure provides a secure and unique technique for onboarding the AV 100 to inhibit unintended control of the wrong AV. In addition, the onboarding marshalling process has the AV 100 flash the unique blinking light code pattern using the different combinations of light devices to protect from third party interference and from multiple AVs flashing at same time. The AV may also flashlights with any frequency supported by its hardware, and is dependent upon the infrastructure to provide a blinking frequency.

The specific messaging format is just one way of defining communication between the AVM CS 106 and the AV 100, and other suitable formats may be employed. For example, the public keys exchanged between the AVM CS 106 and the AV 100 may be provided as part of the blinking command or the vehicle identification command response.

While a specific naming convention is used, other suitable naming conventions may be employed for the commands, handles, or other fields.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system comprising:

a vehicle system provided with an autonomous vehicle and including one or more computing devices configured to:

define a shared virtual secret key with an infrastructure server using a server public key obtained from the infrastructure server;

generate a light code pattern to identify the autonomous vehicle using the shared virtual secret key and a code length;

transmit a vehicle public key and blinking characteristics of the light code pattern;

control one or more selected lighting devices of the autonomous vehicle to perform a flashing sequence indicative of the light code pattern; and transition to a marshalling operation state to have the autonomous vehicle be controlled by the infrastructure server in response to the autonomous vehicle being identified based on the flashing sequence.

2. The system of claim 1, wherein the light code pattern is a binary numerical string in which zero and one are associated with an ON or Off state of at least one of the selected lighting devices.

3. The system of claim 1, wherein the blinking characteristics includes blinking light rate bit characteristics indicating On-Off rate used for the flashing sequence.

4. The system of claim 1, further comprising:

an infrastructure server associated with a facility and including one or more computing devices configured to:

transmit the server public key and the code length to the vehicle system;

authenticate identity of the vehicle system using the vehicle public key;

generate a predicted light code pattern for the autonomous vehicle using the vehicle public key in response to the identity of the vehicle system being authenticated; and initiate autonomous marshalling control of the autonomous vehicle in response to the flashing sequence by the one or more selected lighting devices being indicative of the predicted light code pattern.

5. The system of claim 4, wherein the infrastructure server is configured to determine whether the flashing sequence by the one or more selected lighting devices is indicative of the predicted light code pattern using images of the flashing sequence by the autonomous vehicle.

6. The system of claim 5, wherein the infrastructure server is configured to request the vehicle system to generate a new light code pattern in response to the flashing sequence by the one or more selected lighting devices not being indicative of the predicted light code pattern.

7. The system of claim 5, further comprising a vision system including a plurality of imaging devices arranged in the facility to capture the images of the flashing sequence.

8. The system of claim 4, wherein the infrastructure server is configured to determine the shared virtual secret key using the vehicle public key to verify identity of the vehicle system.

9. A system for autonomously controlling an autonomous vehicle, comprising:

an infrastructure server associated with a facility and including one or more computing devices configured to:

generate a predicted light code pattern using a vehicle public key for the autonomous vehicle to be controlled;

transmit a server public key and a code length to the autonomous vehicle;

authenticate identity of the autonomous vehicle using the vehicle public key;

transmit a flash command initiating a flashing sequence by the autonomous vehicle; and transition to autonomous control of the autonomous vehicle in response to the flashing sequence by the autonomous vehicle being indicative of the predicted light code pattern.

10. The system of claim 9, wherein the one or more computing devices of the infrastructure server transmits a blinking light rate bit characteristic to the autonomous vehicle, the blinking light rate bit characteristic being used for the flashing sequence, the blinking light rate bit characteristics indicating On-Off rate used for the flashing sequence.

11. The system of claim 9, wherein the one or more computing devices of the infrastructure server is configured to determine whether the flashing sequence by the autonomous vehicle is indicative of the predicted light code pattern using images of the flashing sequence by the autonomous vehicle.

12. The system of claim 11, wherein the infrastructure server is configured to request the autonomous vehicle to generate a new light code pattern in response to the flashing sequence by the autonomous vehicle not being indicative of the predicted light code pattern.

13. The system of claim 11, further comprising a vision system including a plurality of imaging devices arranged in the facility to capture the images of the flashing sequence.

14. The system of claim 9, further comprising:

a vehicle system provided with the autonomous vehicle and including one or more computing devices configured to:

generate a light code pattern to identify the autonomous vehicle using a shared virtual secret key and the code length;

transmit a vehicle public key to the infrastructure server;

control one or more selected lighting devices of the autonomous vehicle to perform the flashing sequence indicative of the light code pattern in response to the flash command; and transition to a marshalling operation state to have the autonomous vehicle be controlled by the infrastructure server in response to the infrastructure server transitioning to autonomous control of the autonomous vehicle.

15. The system of claim 14, wherein the light code pattern is a binary numerical string in which zero and one are associated with an ON or Off state of at least one of the selected lighting devices.

16. The system of claim 1, wherein the one or more computing devices of the vehicle system and the one or more computing devices of the infrastructure server employs same prime and generator value to verify identify of each other.

17. A method for autonomously controlling an autonomous vehicle, comprising:

generating, by an infrastructure server, a predicted light code pattern using a vehicle public key for the autonomous vehicle to be controlled;

transmitting, by the infrastructure server, a server public key and a code length to the autonomous vehicle;

authenticating, by the infrastructure server, identity of the autonomous vehicle using the vehicle public key;

transmitting, by the infrastructure server, a flash command initiating a flashing sequence by the autonomous vehicle; and transitioning, by the infrastructure server, to autonomous control of the autonomous vehicle in response to the flashing sequence by the autonomous vehicle being indicative of the predicted light code pattern.

18. The method of claim 17, further comprising:

generating, by a vehicle system, a light code pattern to identify the autonomous vehicle using the shared virtual secret key and the code length;

transmitting, by the vehicle system, a vehicle public key to the infrastructure server;

controlling, by the vehicle system, one or more selected lighting devices of the autonomous vehicle to perform the flashing sequence indicative of the light code pattern in response to the flash command; and transitioning, by the vehicle system to a marshalling operation state to have the autonomous vehicle be controlled by the infrastructure server in response to the infrastructure server transitioning to autonomous control of the autonomous vehicle.

19. The method of claim 18, wherein the predicted light code pattern and the light code pattern are binary numerical strings in which zero and one are associated with an ON or Off state of at least one of the selected lighting devices.

20. The method of claim 17, further comprising:

transmitting, by the infrastructure server, a blinking light rate bit characteristic to the autonomous vehicle, the blinking light rate bit characteristic being used for the flashing sequence and indicating On-Off rate used for the flashing sequence;

capturing, by a vision system, images of the flashing sequence by the autonomous vehicle, wherein the blinking light rate bit characteristics based on operation characteristics of the vision system; and determining, by the infrastructure server, whether the flashing sequence by the autonomous vehicle is indicative of the predicted light code pattern using the images of the flashing sequence.

* * * * *